(12) United States Patent
Miyata

(10) Patent No.: US 8,792,135 B2
(45) Date of Patent: Jul. 29, 2014

(54) IMAGE PROCESSING DEVICE, COMPUTER PROGRAM PRODUCT INCLUDING IMAGE PROCESSING PROGRAM EMBODIED ON COMPUTER READABLE MEDIUM, AND IMAGE FORMING APPARATUS

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 391 days.

(21) Appl. No.: 12/884,408

(22) Filed: Sep. 17, 2010

(65) Prior Publication Data

US 2011/0075221 A1    Mar. 31, 2011

(30) Foreign Application Priority Data

Sep. 29, 2009   (JP) ................... 2009-225190

(51) Int. Cl.
    *H04N 1/40*      (2006.01)
    *G06K 15/00*      (2006.01)

(52) U.S. Cl.
    USPC ............................. 358/3.01; 358/2.1; 358/1.9

(58) Field of Classification Search
    CPC ................... H04N 1/40062; H04N 1/6022
    USPC ................. 358/3.01, 515, 521, 529, 1.1–1.9; 347/43

See application file for complete search history.

(56) References Cited

U.S. PATENT DOCUMENTS 5,774,238 A * 6/1998 Tsukada .................. 358/529
6,196,663 B1 * 3/2001 Wetchler et al. ............. 347/43
6,348,977 B1   2/2002 Ooki
6,441,918 B1 * 8/2002 Hori ........................ 358/1.16
6,876,468 B1   4/2005 Kanno et al.
7,054,029 B1   5/2006 Ohta et al.
7,075,680 B2 * 7/2006 Kitagawara ............. 358/3.15
7,679,795 B2 * 3/2010 Oki ............................. 358/518

(Continued)

FOREIGN PATENT DOCUMENTS

JP      09-277606      10/1997
JP      11069180      3/1999

(Continued)

OTHER PUBLICATIONS

Notifications of Reasons for Refusal for Japanese patent application No. 2009-225190 mailed Jun. 28, 2011.

(Continued)

*Primary Examiner* — King Poon
*Assistant Examiner* — Ibrahim Siddo
(74) *Attorney, Agent, or Firm* — Banner & Witcoff, Ltd.

(57) ABSTRACT

An image processing device include a memory, a rasterizer and a color space converter. The rasterizer is configured to generate raster data expressed in a first color space by rendering an object in the memory. The color space converter is configured to convert the raster data from the first color space to a second color space capable of being set so as to reproduce gray of gray pixels in the object by any one of a black coloring material and mixture of multiple color materials. The rasterizer determines whether the gray is reproduced by the black coloring material or the mixture of multiple color materials based on an attribute of the object and adds the gray reproduction information that is obtained from the determination to the raster data. The color space converter sets pixel levels in the second color space based on the gray reproduction information.

13 Claims, 6 Drawing Sheets

(56) References Cited

U.S. PATENT DOCUMENTS

| | | |
|---|---|---|
| 7,692,813 B2 | 4/2010 | Ohta et al. |
| 2004/0257621 A1 | 12/2004 | Ishihara |
| 2005/0071104 A1* | 3/2005 | Viturro et al. ............ 702/85 |
| 2005/0275856 A1 | 12/2005 | Oki |
| 2006/0152750 A1 | 7/2006 | Ohta et al. |
| 2007/0052988 A1* | 3/2007 | Matsuoka et al. ............ 358/1.9 |

FOREIGN PATENT DOCUMENTS

| | | |
|---|---|---|
| JP | 11-238119 | 8/1999 |
| JP | 2000259819 | 9/2000 |
| JP | 2001-285662 | 10/2001 |
| JP | 2002135576 | 5/2002 |
| JP | 2003259140 | 9/2003 |
| JP | 2004-320141 | 11/2004 |
| JP | 2005354414 | 12/2005 |
| JP | 2008086033 | 4/2008 |

OTHER PUBLICATIONS

Notification of Reasons for Refusal for Japanese patent application No. 2009-225190 mailed Mar. 6, 2012.

Notification of Reasons for Refusal for Japanese patent application No. 2009-225190 mailed Dec. 22, 2011.

* cited by examiner

IMAGE PROCESSING DEVICE, COMPUTER PROGRAM PRODUCT INCLUDING IMAGE PROCESSING PROGRAM EMBODIED ON COMPUTER READABLE MEDIUM, AND IMAGE FORMING APPARATUS

CROSS REFERENCE TO RELATED APPLICATION

The application claims priority from Japanese Patent Application No. 2009-225190 filed on Sep. 29, 2009. The entire content of this priority application is incorporated herein by reference.

TECHNICAL FIELD

The present disclosure relates to an image processing apparatus, a computer program produce including an image processing program embodied on a computer-readable medium, and an image forming apparatus.

BACKGROUND

When color space of image data is converted to the CMYK color space, gray may be reproduced by mixture of four coloring materials, that is, cyan (C), magenta (M), yellow (Y) and black (K) coloring materials, or by only black (K) coloring material is used. When the gray is reproduced by the mixture of four coloring materials, good tone continuousness can be provided between gray areas and chromatic color areas therearound. When it is reproduced by the black coloring material, the gray areas look sharp.

In a known system, reproducing gray either by mixture of CMYK or by black is determined depending on whether a chromatic color area is present around the gray area.

In the known system, a chromatic area is present around a gray area, reproducing gray by the mixture of CMYK. And In the known system, reproducing gray reproduces by black when a chromatic color area is not present around the gray area.

however in the known system, the gray is not always reproduced appropriately for objects. This is because the best way to reproduce gray depends on an attribute of an object that includes the gray pixels. Therefore, there is a need in the art to reproduce gray appropriately for different types of objects in an image processing device and an image forming apparatus, and an image processing program that can enable the reproduction of gray suitable for different types of objects is needed.

SUMMARY

An image processing device according to an aspect of the present invention includes a memory, a rasterizer and a color space converter. The rasterizer is configured to generate raster data expressed in a first color space by rendering an object in the memory. The object is to be printed according to drawing commands. The rasterizer determines whether the gray of the gray pixels is to be reproduced by the black coloring material or the mixture of multiple color materials based on an attribute of the object and adds gray reproduction information on how to reproduce the gray for each gray pixel to the raster data. The color reproduction information is obtained from the determination. The color space converter is configured to convert the raster data from the first color space to a second color space capable of being set so as to reproduce gray of gray pixels in the object by any one of a black coloring material and mixture of multiple color materials. The color space converter sets pixel levels in the second color space based on the gray reproduction information.

Generally, raster data does not include object property information. The raster data generated according to drawing commands cannot provide information on an attribute of the object. Therefore, how to reproduce gray of each gray pixel cannot be determined for color space conversion.

The image processing device of the present invention determines how to reproduce gray based on an attribute of an object when rendering the object in the memory and adds gray reproduction information obtained from the determination result to raster data. Thus, how to reproduce the gray for each gray pixel can be determined based on the gray reproduction information.

An image forming apparatus according to an aspect of the present invention includes an image processing device and an image forming device. The image processing device includes a memory, a rasterizer and a color space converter. The rasterizer is configured to generate raster data expressed in a first color space by rendering an object in the memory. The object is to be printed according to drawing commands. The rasterizer determines whether the gray of the gray pixels is to be reproduced by the black coloring material or the mixture of multiple color materials based on an attribute of the object and adds gray reproduction information on how to reproduce the gray for each gray pixel to the raster data. The gray reproduction information is obtained from the determination. The color space converter is configured to convert the raster data from the first color space to a second color space capable of being set so as to reproduce gray of gray pixels in the object by any one of a black coloring material and mixture of multiple color materials. The color space converter sets pixel levels in the second color space based on the gray reproduction information. The image forming device is configured to form an image on a recording medium based on the raster data expressed in the second color space generated by the image processing device. This image forming apparatus can reproduce gray more appropriately for different types of objects.

A computer program product including an image processing program embodied on a computer-readable medium and operable on a computer having a memory of an aspect of the present invention includes code for the following operation performed by the computer:

generating raster data expressed in a first color space by rendering an object in the memory, the object to be printed according to drawing commands;

converting the raster data from the first color space to a second color space capable of being set so as to reproduce gray of gray pixels in the object by any one of a black coloring material and mixture of multiple color materials;

determining whether the gray of the gray pixels is to be reproduced by the black coloring material or the mixture of multiple color materials based on an attribute of the object and adding color reproduction information on how to reproduce the gray for each gray pixel to the raster data, the color reproduction information being obtained from the determination; and setting pixel levels in the second color space based on the color reproduction information.

With this program, gray can be reproduced appropriately for different types of objects.

BRIEF DESCRIPTION OF THE DRAWINGS

Illustrative aspects in accordance with the present invention will be described in detail with reference to the following drawings wherein.

DETAILED DESCRIPTION

<Illustrative Aspect>

An illustrative aspect of the present invention will be explained with reference to FIGS. 1 through 6.

1. General Construction of Printing System

Figure 1:
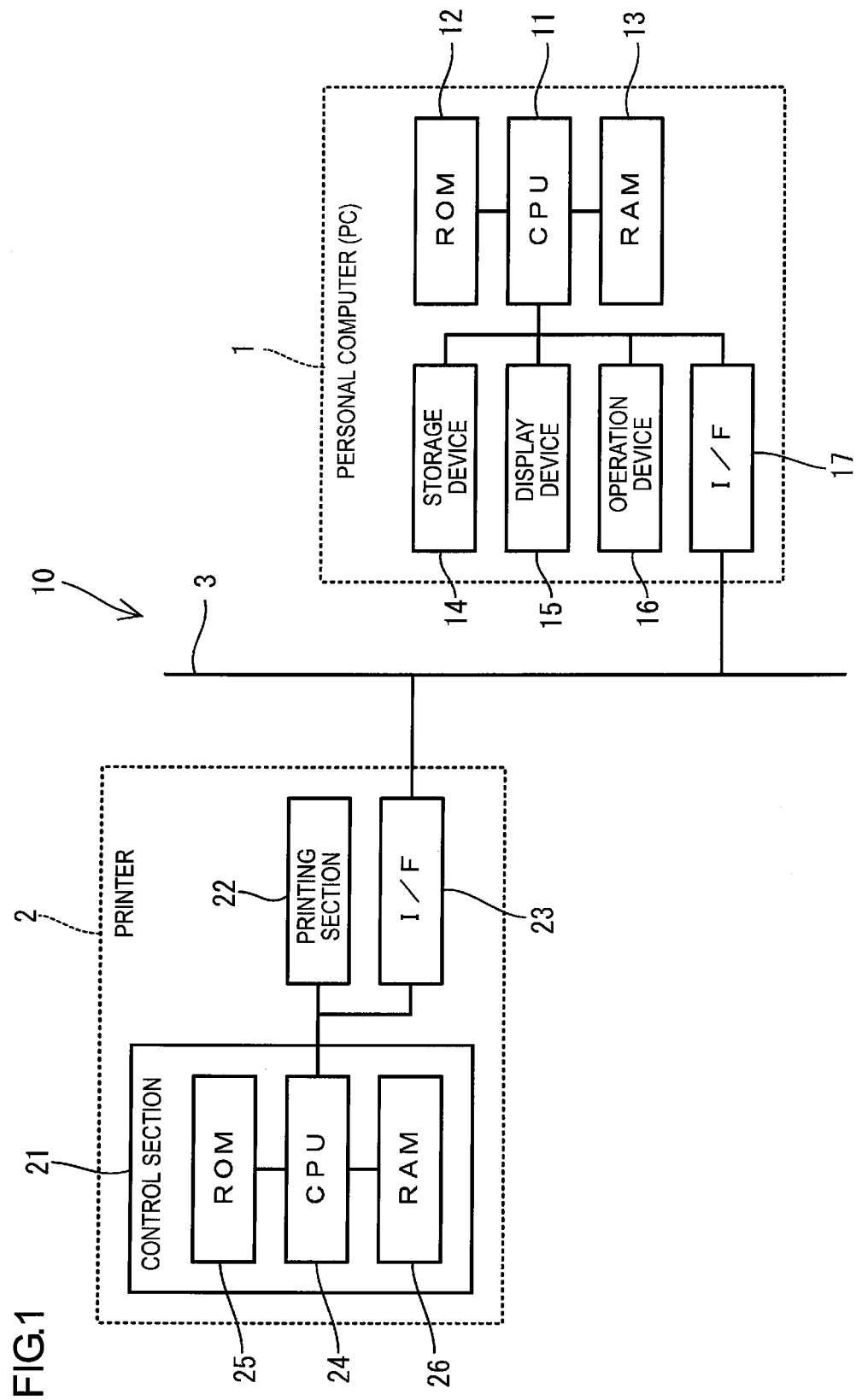
FIG. 1 is a schematic diagram illustrating a configuration of a printing system according to one of the illustrative aspects of the invention.

As illustrated in FIG. 1, a printing system 10 includes a personal computer 1, a printer 2 and a communication network 3 that makes connection between the PC 1 and the printer 2 such that they can communicate with each other. The personal computer 1 is an example of image processing device and referred to as a PC hereinafter. A local area network (LAN) is an example of the communication network 3.

1-1. Electrical Configuration of PC

The PC 1 includes a CPU 11, a ROM 12, a RAM 13, a storage device 14, a display device 15, an operation device 16 and a network interface device (I/F) 17. The CPU 11 is an example of rasterizer and color space converter. The ROM 12 and the RAM 13 are examples of memory. The CPU 11 controls different sections of the PC 1 by executing various programs stored on the ROM 12. The ROM 12 stores the programs and data. The RAM 13 is a main memory used by the CPU 11 for executing various processes.

The storage device 14 is an external storage device including a hard disk drive and nonvolatile storage medium, such as flash memory, for storing various programs and data. The storage device 14 stores a printer driver for the printer 2 and application software including image editing software and word processing software. The printer driver is an example of an image processing program.

The display device 15 is a CRT or a liquid crystal display. The operation device 16 includes a mouse and a keyboard. The network interface device 17 is connected to external devices including the printer 2 via the communication network 3.

1-2. Electrical Configuration of Printer

The printer 2 includes a control section 21, a printing section 22 and a network interface section (I/F) 23. The control section 21 includes a CPU 24, a ROM 25 and a RAM 26. The CPU 24 controls different sections of the printer 2 by executing various programs stored in the ROM 25. The ROM 25 stores the programs and data. The RAM 26 is a main memory used by the CPU 24 for various processes.

The printing section 22 is configured to print a color image on a recording medium using four colors of toner, cyan (C), magenta (M), yellow (Y) and black (K), using laser printing technology or LED printing technology. It may use inkjet printing technology for printing a color image. The network interface device 23 is connected to external devices including the PC 1 via the communication network 3.

2. Overall Flow of Printing Process on PC

In the following description, a printer driver, an application program and an operation system (OS) are embodied on the CPU 11.

When a printing request is input by a user, the application program sends drawing commands to the OS. Then, the OS sends drawing commands to the printer driver via an interface thereof. The printer driver renders an object to be printed on the RAM 13 according to the drawing commands. Then, it generates RGB raster data and converts it from the RGB color space to the CMYK color space. The CMYK raster data is binarized and sent to the printer 2. Gray expressed in the CMYK color space can reproduced by either a black coloring material or mixture of multiple coloring materials.

Figure 2:
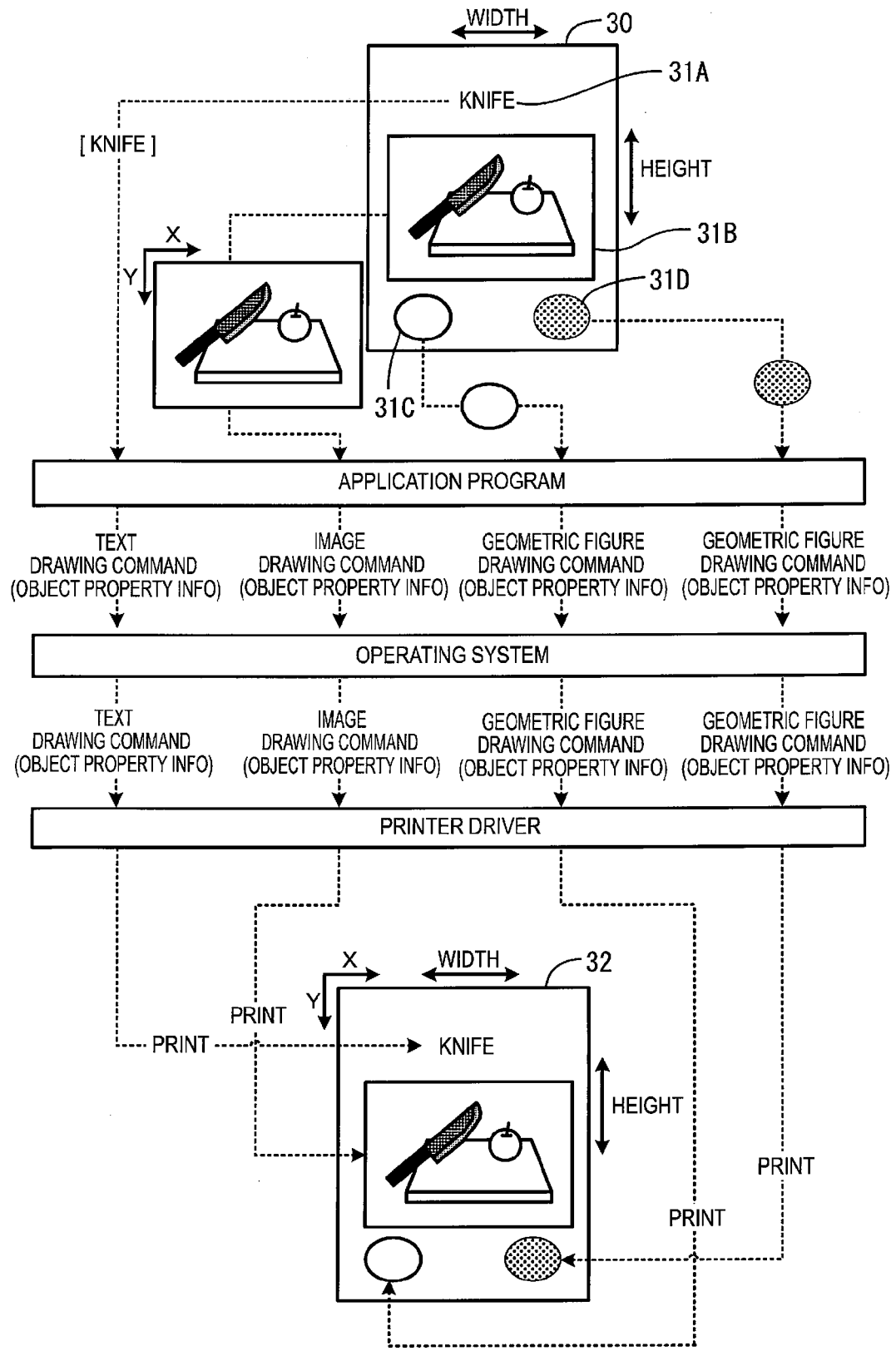
FIG. 2 is a schematic diagram illustrating a flow of drawing objects.

A flow of the raster data generating process will be explained with reference to FIG. 2.

When a printing request is input, the application program sends the drawing commands to the OS to read object data and information for drawing the objects (31A, 31B, 31C, 31D) on a page 30 that is selected as a page to be printed. The information includes font types, font sizes, colors and drawing locations of the objects. Such data and information for drawing the objects are referred to as object property information hereinafter. The drawing commands sent from the program to the OS to read the object property information are referred to as drawing commands for the OS.

Each object has an attribute. For example, if the object is text (e.g., the object 31A), the attribute thereof is "text." If the object is an illustration or a photo image (e.g., the object 31B), the attribute thereof is "image." If the object is a geometric figure, such as a straight line, a curved line, a polygon, a circle and an ellipse (e.g., the objects 31C, 31D), the attribute thereof is "figure." The drawing commands sent to the OS differ depending on the attribute of the object. For example, if the object has the text attribute (i.e., the text object), the commands for drawing text are sent to the OS. If the object has the image attribute (i.e., the image object), the commands for drawing an image is sent. If the object has the figure attribute (i.e., the figure object), the commands for drawing a geometric figure is sent.

The OS sends the drawing commands that is readable for the printer driver (hereinafter referred to as page data) to the printer driver every time it receives the drawing command for the OS corresponding to one page from the application program. Namely, the OS converts the drawing commands for the OS to the drawing commands for the printer driver. A command that indicates an end of the page is added to the page data (i.e., at the end of the drawing commands for the printer driver).

Figure 3:
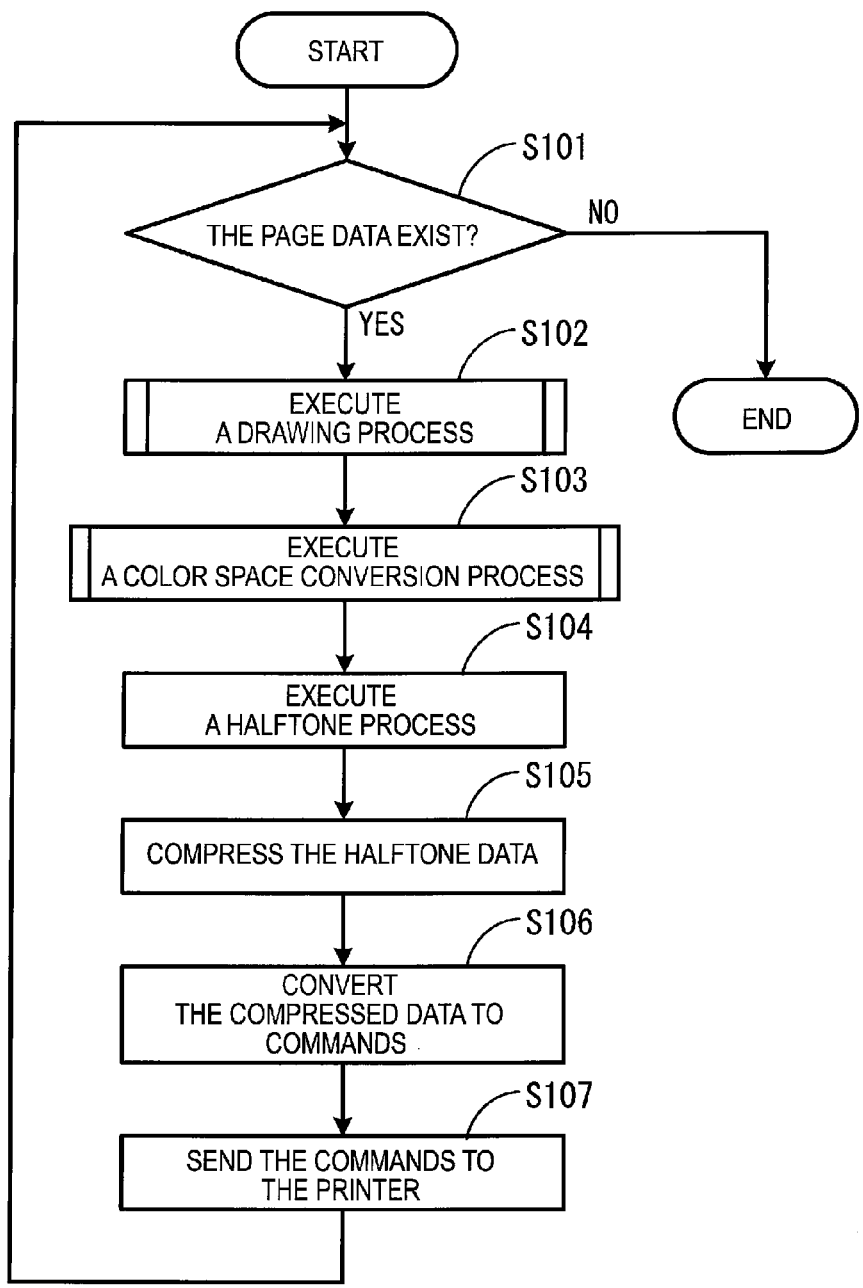
FIG. 3 is a flowchart illustrating a flow of printing process executed by a printer driver.

An overall flow of the printing process controlled by the printer driver will be explained with reference to FIG. 3. This process starts when the printer driver has received a command to start printing from the OS.

In step S101, the printer driver determines whether the page data exists. If the page data does not exist, the printer driver terminates the process. At the beginning of this process, page data should exist. Therefore, the printer driver proceeds to step S102.

In step S102, the printer driver executes a drawing process based on the page data. In the drawing process, the drawing commands are retrieved from the page data in sequence and an object corresponding to the retrieved drawing commands is rendered on the RAM 13. Then, raster data expressed in the RGB color space is generated. The drawing process will be explained more in detail later.

In step S103, the printer driver executes a color space conversion process for the generated raster data. In the process, the raster data is converted from the RGB color space to the CMYK color space. The color space conversion process will be explained more in detail later.

In step S104, the printer driver executes halftone process (binarization) by, for example, a dither method or an error diffusion method for the CMYK raster data, and creates a binarized image (i.e., halftone data) made of a dot pattern for each color of toner to be printed on the recording medium.

In step S105, the printer driver compresses the halftone data.

In step S106, the printer driver converts the compressed halftone data into a page-description language (PDL) format (or into commands).

In step S107, the printer driver sends the commands of the halftone data to the printer 2.

When the printer 2 receives the commands (of the halftone data) from the PC 1, it interprets the commands and starts printing an image on the recording medium.

3. Drawing Process

Figure 4:
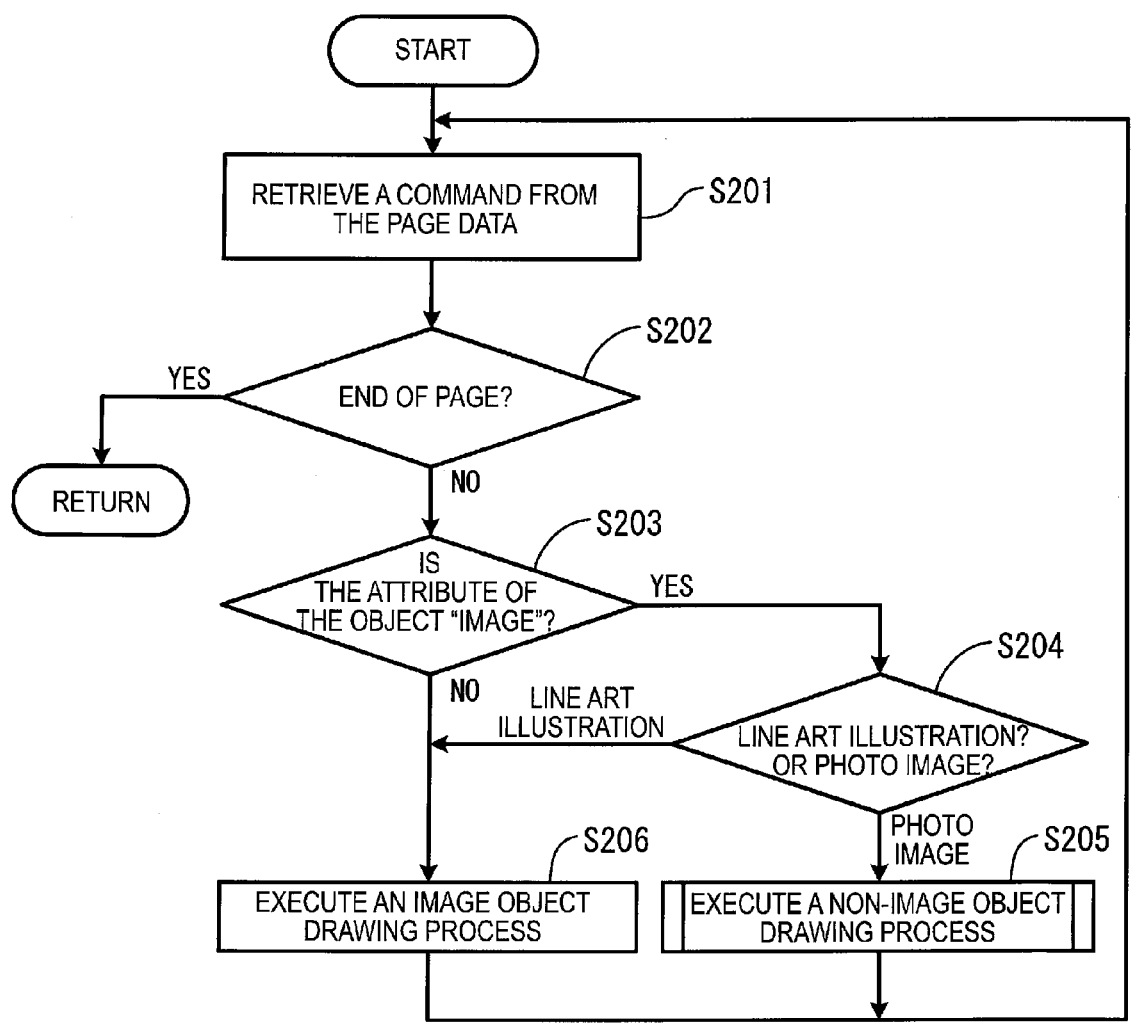
FIG. 4 is a flowchart illustrating a flow of drawing process.

The drawing process executed in step S102 will be explained with reference to FIG. 4.

In step S201, the printer driver retrieves a command from the page data.

In step S202, the printer driver determines whether the retrieved command is one of the drawing commands or the command indicating the end of page. If it is the drawing command, the printer driver proceeds to step S203. If it is the command indicating the end of page, the printer driver terminates the process and returns to the process illustrated in FIG. 3.

In step S203, the printer driver determines whether the attribute of the object to be drawn is "image." Specifically, the printer driver determines that the drawing command is an image object drawing command if the attribute of the object is "image." If the command is the text drawing command or the geometric figure drawing command, the printer driver determines that it is other than "image."

In this aspect, when the attribute of the object is determined as "image" in step S203, gray of the gray pixels among the pixels in the object are reproduced by the mixture of multiple colors of toner. If the attribute is determined as "other than image," the gray pixels among the pixels in the object are reproduced by the black toner. Namely, step S203 is an example of a process for determining whether gray is to be reproduced by mixture of multiple coloring materials or a black coloring material based on the attribute of the object.

If the attribute of the object is "image," the printer driver proceeds to step S204. If it is not "image," the printer driver proceeds to step S206.

In step S204, the printer driver determines whether the object to be drawn, which is an image in this case, is a line art illustration or a photo image that is created by capturing a subject by a digital still camera. The reason why the determination is required is because the gray pixels of the illustration are printed with the black toner even the attribute thereof is "image."

In general, line art illustrations use a small number of colors while photo images use a large number of colors. The printer driver determines the image as a line art illustration if the number of colors included therein is smaller than 256. If it is equal to or larger than 256, the printer driver determines the image as a photo image. In this aspect, the number of colors to determine whether an image is an illustration or an image is set to 256. However, it can be set to a different number. Furthermore, whether the image is a line art illustration or a photo image can be determined based on image analysis.

If the image is a photo image, the printer driver proceeds to step S205. If it is a line art illustration, the printer driver proceeds to step S206.

In step S205, the printer driver executes an image object drawing process. In the image object drawing process, each one of the pixels that form the image object is rendered on the RAM 13 and gray reproduction information on how to reproduce gray of the gray pixels is determined based on the result of the determination in step S203 is added to the raster data. The image object drawing process will be explained more in detail later. When this process is complete, the printer driver returns to step S201.

In step S206, the printer driver executes a non-image object drawing process for drawing an object other than an image. In the non-image drawing process, the object corresponding to the drawing commands, which is a text or a geometric figure in this case, is rendered on the RAM 13. In this process, the gray reproduction information is not added to the raster data. When this process is complete, the printer driver returns to step S201.

4. Image Object Drawing Process

Figure 5:
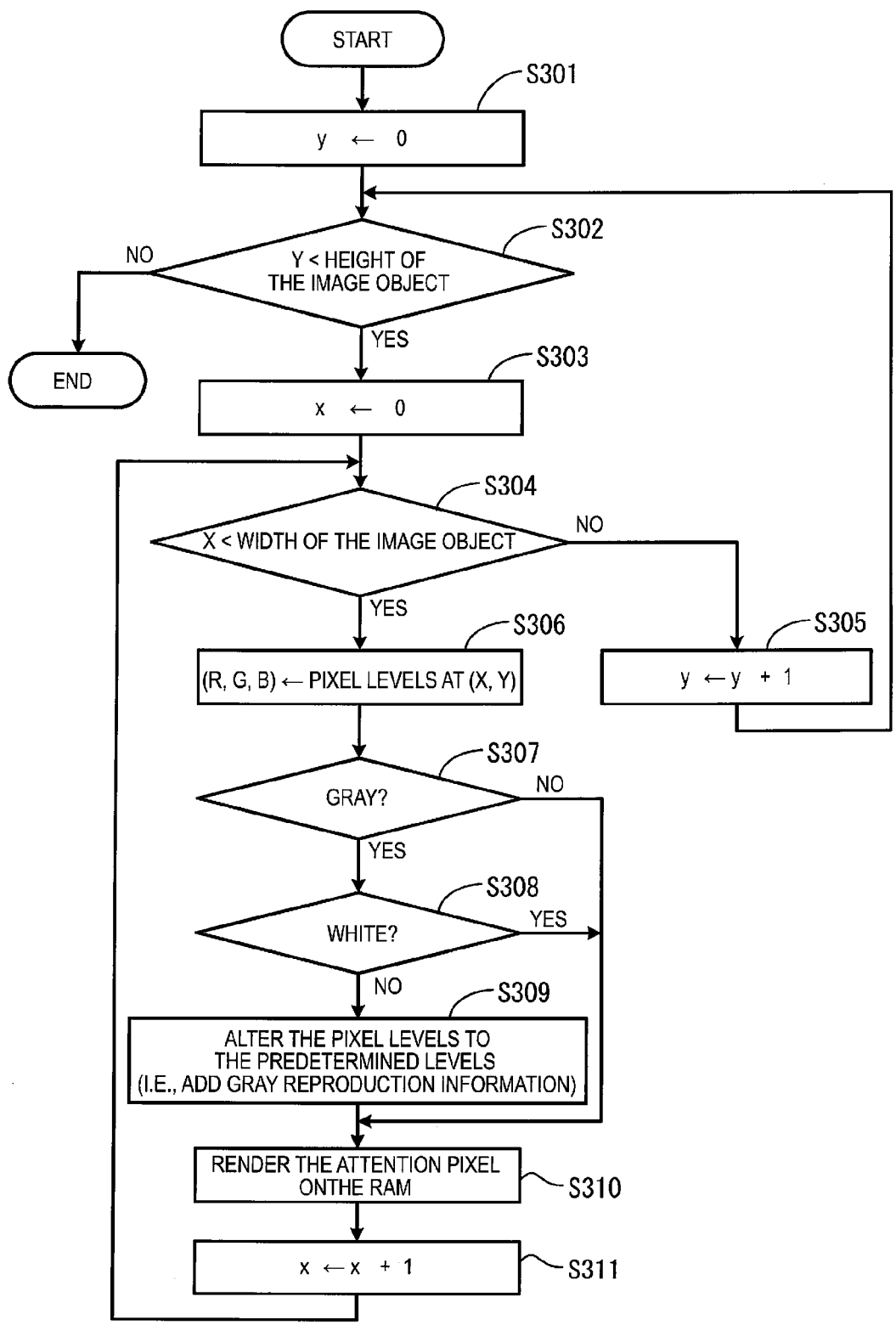
FIG. 5 is a flowchart illustrating a flow of drawing process for an image.

The image object drawing process executed in step S205 will be explained with reference to FIG. 5.

In step S301, the printer driver sets the variable y that indicates a Y-coordinate of an attention pixel, which is a pixel currently under processing among the pixels that form the image object, to 0 (zero) as a default.

In step S302, the printer driver compares the height of the image object with the variable y. For example, the printer driver compares the number of the pixels in a vertical line of the image object 31B in FIG. 2 with the variable y. The printer driver then determines whether the drawing process is complete for all lines of the object. If the drawing process is not complete, the printer driver proceeds to step S303. If it is complete, the printer driver terminates the process and returns to the process illustrated in FIG. 4.

In step S303, the printer driver sets the variable x that indicates an X-coordinate of the attention pixel to 0 (zero) as a default.

In step S304, the printer driver compares the width of the image object with the variable x. For example, the printer driver compares the number of the pixels in a horizontal line of the image object 31B in FIG. 2 with the variable x. The printer driver then determines whether the drawing process is complete for all pixels in one line of the object. If the drawing process is not complete, the printer driver proceeds to step S305. If it is complete, the printer driver proceeds to step S306.

In step S305, the printer driver increments the variable y by 1 and returns to step S302.

In step S306, the printer driver retrieves color component information (RGB components) on the pixel at a point of the image object represented by (x, y) coordinates, that is the attention pixel.

In step S307, the printer driver determines whether the color component information indicates gray (i.e., R=G=B). If the information indicates gray, the printer driver proceeds to step S308. If it does not, the printer driver proceeds to step S310.

In the RGB color space, a tone of each color component is expresses in 256 discrete levels (0 to 255). (R, G, B)=(0, 0, 0) represents black, and (R, G, B)=(255, 255, 255) represents white. In this aspect, black and white are also included in shades of gray.

In step S308, the printer driver determines whether the color component information indicates white (i.e., R=G=B=255). If the information does not indicate white, the printer driver proceeds to step S309. If the information indicates white, the printer driver proceeds to step S310.

In step S309, the printer driver increments the pixel levels of the R and the G components by 1 to alter the color components to predetermined color components expressed by (R+1, R+1, B). For example, if original color components are expressed by pixel levels (127, 127, 127), the predetermined color components are defined by pixel levels (128, 128, 127). If the original color components are expressed by pixel levels (200, 200, 200), the predetermined color components are defined by pixel level (201, 201, 200). Namely, the predetermined color components do not refer to specific colors. How to define them is predetermined and therefore they take different pixel levels depending on the original color components.

Altering the color components of the gray pixel to the predetermined color components is an example of adding gray reproduction information to the raster data. In the non-image object drawing process, the gray reproduction information is not added to the raster data, that is, the color components of the gray pixel are not altered to the predetermined color components. Namely, the pixel levels of the color components of the gray pixel are R=G=B, which indicates gray. In the image object drawing process, the color components of the gray pixel are altered to the predetermined color components. Namely, when the color components match the predetermined color components, the pixel is a gray pixel that should be printed with the mixture of multiple colors of toner, and when the color components represent gray, the pixel is a gray pixel that should be printed with the black toner. In this aspect, the gray pixel that is to be printed with the black toner is indirectly indicated by not adding the gray reproduction information.

Step S309 is not performed when the color components are determined as white in step S308. This is because the pixel levels that represent white are (255, 255, 255) and they exceed the upper limit (255) of the tonal range (0 to 255) if the are incremented by 1.

In step S310, the printer driver renders the attention pixel on the RAM 13.

In step S311, the printer driver increment the variable x by 1 and returns to step S304.

5. Color Space Conversion Process

Figure 6:
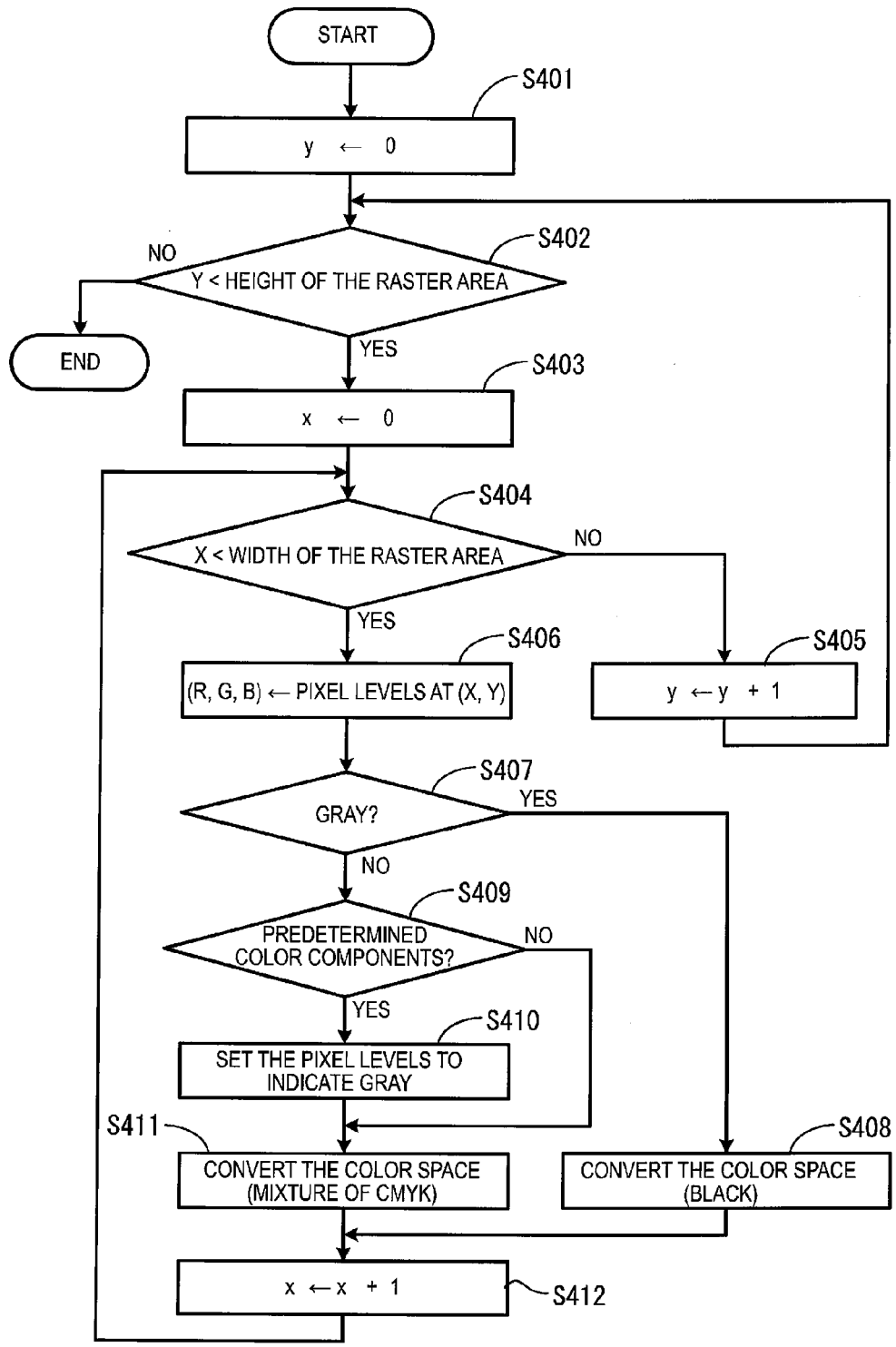
FIG. 6 is a flowchart illustrating a flow of color space conversion process.

A color space conversion process will be explained with reference to FIG. 6.

In step S401, the printer driver sets the variable y to 0 as a default. The variable y indicates the Y-coordinate of the attention pixel, which is a pixel being currently under processing among the pixels in the raster area.

In step S402, the printer driver compares the height of the raster area with the variable y. For example, the printer driver compares the number of the pixels in a vertical line of the raster area 32 in FIG. 2 with the variable y. The printer driver then determines whether the color space conversion process is complete for all lines in the raster area. If the process is not complete, the printer driver proceeds to step S403. If it is complete, the printer driver terminates the process and returns to the process illustrated in FIG. 3.

In step S403, the printer driver sets the variable x to 0 as a default. The variable x indicates the X-coordinate of the attention pixel.

In step S404, the printer driver compares the width of the raster area with the variable x. For example, the printer driver compares the number of the pixels in a horizontal line of the raster area 32 in FIG. 2 with the variable x. The printer driver then determines whether the color space conversion process is complete for one line in the raster area. If the process is complete, the printer driver proceeds to step S405. If it is not complete, the printer driver proceeds to step S406.

In step S405, the printer driver increments the variable y by 1 and returns to step S402.

In step S406, the printer driver retrieves the color component information (RGB component information) of the pixel at (x, y) coordinates in the raster area (i.e., the attention pixel).

In step S407, the printer driver determines whether the color components indicate gray (R=G=B). If they indicate gray, the printer driver exceeds to step S408. If they do not, the printer driver proceeds to step S409.

In step S408, the printer driver converts the pixel levels of the attention pixel from the RGB color space to the CMYK color space. In the conversion, the printer driver sets the pixel levels of the color components of the attention pixel (the gray pixel) so that the attention pixel is to be printed with the black toner. The following equations are example equations for converting the gray pixel that is to be printed with the black toner from the RGB color space to the CMYK color space.

$C=0$ $M=0$ $Y=0$ $K=255-R(=255-G=255-B)$

In step S409, the printer driver determines whether the color components are the predetermined color components (R=G=B+1). If the color components are the predetermined color components, the printer driver proceeds to step S410. If they are not, the printer driver proceeds to step S411.

In step S410, the printer driver decrements the pixel levels of the R component and the G component by 1 such that the color components indicate gray.

In step S411, the printer driver converts the pixel levels of the attention pixel from the RGB color space to the CMYK color space. In the conversion, the printer driver sets the pixel levels of the color components of the attention pixel so that the attention pixel is to be printed with the mixture of multiple colors of toner. The following equations are example equations for converting the pixel that is to be printed with the mixture of multiple colors of toner from the RGB color space to the CMYK color space.

$C=255-R-K$ $M=255-G-K$ $Y=255-B-K$ $K=\min(255-R, 255-G, 255-B)$

In this aspect, the equations are used for the color space conversions. However, a lookup table (LUT) can be used for the conversions. In the lookup table, relationships between the color components expressed in the RGB color space and the CMYK color space are defined.

In step S412, the printer driver increments the variable x by 1 and returns to step S404.

6. Effects of Illustrative Aspect

If the gray pixels are a part of a character or a line, gradation is less likely to present between the gray area and the surrounding chromatic color areas, that is, the tone does not change gradually from the gray area to the surrounding chromatic color areas. Therefore, tone continuousness is not necessary to be considered. Even if chromatic color areas are present around the gray area, the character or the line is better to be printed with the black toner so that it looks sharp and clear. Furthermore, color materials, that is, toner can be saved when the character or the line is printed with the black toner.

If the gray pixels are a part of an image, gradation is more likely to be present between the gray area and the chromatic color areas. If the chromatic color areas are present around the gray area, the gray area should be printed with the mixture of multiple colors of toner. Even if chromatic color areas are not present around the gray area, the gray area should be printed with the mixture of multiple colors of toner so that the gray area does not look distinguished from other gray areas. Namely, shades of gray do not look different from part to part of the image and thus the image looks natural.

The printer driver of this aspect determines that the gray pixel is to be printed with the mixture of multiple colors of toner when an attribute of an object is image. If the attribute is not an image, the printer driver determines that the gray pixel is to be printed with the black toner. Therefore, gray is appropriately reproduced.

The raster data does not include object property information. Therefore, the raster data generated according to the drawing command does not provide information on the attribute of the object including the gray pixel. Namely, how to reproduce gray of the gray pixel cannot be determined for the color space conversion. The printer driver of this aspect determines how to reproduce gray based on the attribute of the object for every gray pixel when rendering the object, and adds the gray reproduction information to the raster data. Namely, the raster data can provide information on how to express gray for each gray pixel.

The printer driver renders the object corresponding to the drawing commands on the RAM 13, and generates the raster data expressed in the RGB color space. Then, the printer driver converts the raster data from the RGB color space to the CMYK color space, that is, the raster data expressed in the CMYK color space is generated from the raster data expressed in the RGB color space. The OS outputs the drawing commands for the printer driver on the assumption that the color components of the object are expressed in the RGB color space. If the raster data expressed in the CMYK color space is directly generated without converting from the raster data expressed in the RGB color space when the drawing commands are output, colors may not appropriately reproduced. On the other hand, if the RGB raster data is generated when the drawing commands are output and converted to the CMYK raster data, colors can be appropriately reproduced.

Furthermore, this printer driver adds the gray reproduction information to the raster data by altering the color components of the gray pixels. With this configuration, a data storage area for storing the information on the RAM 13 is not required, and gray is appropriately reproduced while the memory space of the RAM 13 is saved.

This printer driver also alters the color components of the gray pixels that are determined so as to be printed with the mixture of multiple colors of toner to the predetermined color components. In this aspect, the color components of the gray pixels that match the predetermined color components are altered so as to represent gray. The original color components of the pixels do not represent gray and thus the pixels should be printed with not only the black toner but also other colors of toner. If the pixels are printed with only the black toner, the color reproducibility decreases because the shades of gray are greatly different from the tones of colors of the original color components. On the other hand, when the color components of the gray pixels that are determined so as to be printed with the mixture of multiple colors are altered to the predetermined color components, the pixels, color components of which match the original color components, are printed with the mixture of multiple colors of toner. Therefore, the color reproducibility does not decrease.

This printer driver also alters the color components of the pixels that match the predetermined color components so as to represent gray. Therefore, gray can be reproduced even when the rasterizer considerably alters the color components, that is, the rasterizer can alter the color components in a wider range.

Furthermore, this printer driver alters the color components to the predetermined color components by increasing the pixel level of at least one color component of the RGB components of each gray pixel. If the increased pixel level exceeds the upper limit (255) of the tonal range (0 to 255) of each RGB component, the printer driver does not alter the color components. If the pixel level of the gray pixel is expected to exceed the upper limit after increasing the pixel level, the gray pixel will be printed with the black toner even though it is a type of pixel that should be printed with the mixture of multiple colors of toner. However, the pixel level 255 represents a color component that does not required toner for print and thus effects on the output due to differences between how to reproduce color of the pixel is very small. Therefore, gray of all gray pixels are appropriately reproduced.

This printer driver alters at least one of the pixel levels of the RGB components such that a difference between the pixel level of a B component of the RGB components and the pixel levels of R and G components of the RGB components relatively changes when altering the color components of the gray pixels expressed in the RGB color space to the predetermined color components. The Y component (i.e., yellow) in the CMYK color space is positively correlated with the B component (i.e., blue) at a high level. Because changes in the Y component are less likely to affect on color in terms of color perception of human eyes, changes in color from original color by altering the pixel levels of the RGB components the B component are less likely to affect on an output of the printer 2.

Furthermore, this printer driver alters the pixel levels of the R and the G components with the pixel level of the B component maintained when altering the pixel levels of the RGB components.

This printer driver determines that the gray pixels are to be printed with only black toner if the attribute of the object is image but the object is a line art illustration. In general, line art illustrations use a small number of colors and thus tone continuousness between the gray area and the chromatic color areas is not necessary to be considered. The gray area looks clear when it is printed with only black toner.

<Other Illustrative Aspects>

The present invention is not limited to the illustrative aspect explained in the above description. The following illustrative aspects may be included in the technical scope of the present invention, for example.

(1) In the above aspect, the CMYK color space is used as an example of the second color space. This is because the printer uses four colors of toner, that is, CMYK toner. Any type of the second color space can be selected according to the number of colors of toner that a printer uses for printing as long as the gray pixels can be printed either the black toner or the mixture of multiple colors of toner. Furthermore, any type of color space can be selected for input image data.

(2) In the above aspect, the gray reproduction information is added to the raster data by altering the color components of the gray pixels to the predetermined color components, that is, the gray reproduction information is embedded into the raster data. However, data containing coordinates of the gray pixels, which will be printed by the mixture of colors of toner, may be separately created and added to the raster data. In this case, the gray pixels, coordinates of which are not included in the data, will be printed with the black toner. The coordinates of such gray pixels can be included in the data.

(3) In the above aspect, the color components of the gray pixels included in the pixels of the object having the attribute of "image" are altered to the predetermined color components. If the attribute of the object is not "image," the color components are not altered. However, they can be set the other way around, that is, the color components may not be altered when the attribute is "image" and may be altered when the attribute is not "image."

(4) In the above aspect, if the color components of the pixel match the predetermined color components, they are set so as to reproduce gray and the pixel is printed with the mixture of multiple colors of toner. However, the pixel may be printed with the mixture of colors of toner without setting the color components thereof so as to reproduce gray.

(5) In the above aspect, the gray pixels are printed with the mixture of multiple colors when the attribute thereof is "image" and with the black toner when the attribute is not "image." However, how to reproduce colors may be determined based on other types of attribute. For example, an object may be printed with the mixture of multiple colors of toner when the attribute thereof is "image" or "figure" and with the black toner when the attribute is "text."

(6) In the above aspect, the PC is used as an example of an image processing device. However, a control section of the printer can be used as an image processing device. In this case, the printer including the control section and an image forming section that forms an image on a recording medium based on the raster data generated by the control section and expressed in the CMYK color space is an example of an image forming apparatus.

What is claimed is:

1. An image processing device comprising:
   a receiver configured to receive a drawing command to execute a drawing process, the drawing command including object data;
   a processor; and
   memory storing instructions that, when executed by the processor, cause the image processing device to:
      determine whether the receiver has received the drawing command;
      specify whether the received drawing command is an image drawing command in response to a determination that the receiver has received the drawing command;
      determine, in response to a specification that the received drawing command is the image drawing command, that a gray color of gray pixels included in the object data is to be reproduced by a mixture of multiple color materials;
      generate, in response to a determination that the gray color is to be reproduced by the mixture of multiple color materials, first gray reproduction information representing that the gray color for each gray pixel is to be reproduced by the mixture of the multiple color materials;
      determine, in response to a specification that the received drawing command is not the image drawing command, that the gray color of gray pixels included in the object data is to be reproduced by black coloring material;
      generate, in response to a determination that the gray color is to be reproduced by the black coloring material, second gray reproduction information representing that the gray color for each gray pixels is to be reproduced by the black coloring material;
      generate raster data expressed in a first color space by rendering the object data to include the first gray reproduction information or the second gray reproduction information for each gray pixel;
      convert the raster data from the first color space to a second color space based on a corresponding one of the first and second gray reproduction information included in the raster data, the second color space being different from the first color space, and wherein, in the second color space, the gray color of the gray pixels is reproduced by a corresponding one of the black coloring material and the mixture of multiple color materials;
      alter, in response to the specification that the received drawing command is the image drawing command, original color components of the gray color of the gray pixels included in the object data to predetermined color components that are different from the original color components of the gray color in the first color space, and thereby generate the first gray reproduction information based on the predetermined color components of the gray pixels;
      determine, in the first color space, whether a gray pixel of the data includes color components that match the predetermined color components;
      determine, in the response to a determination that the gray pixel includes the color components that match the predetermined color components that the gray color is to be reproduced by the mixture of multiple coloring materials;
      return, in response to a determination that the gray pixel included the color components that match the predetermined color components and that the gray color is to be reproduce by the mixture of multiple coloring materials; the predetermined color components of the gray pixel to the original color components of the gray color in the first color space;
      after returning the predetermined color components of the gray pixel to the original color components of the gray pixel in the first color space, convert the raster data including the gray pixel including the returned original color components form the first color space to the second color space so that the gray color is produce by the mixture of multiple coloring materials;
      determine, in the first color space, whether the gray pixel of the raster data includes color components that match the original color components of the gray color; and
      convert, in response to a determination that the gray color, the raster data including the gray pixel form the first color space to the second color space so that the gray color is produced by the black coloring material.

2. The image processing device according to claim 1, wherein pixel levels are converted from the first color space to the second color space, in response to determining that the gray pixel includes the color components that match the predetermined color components, so that the gray color is produced by the mixture of multiple coloring materials.

3. The image processing device according to claim 1, wherein:
   the first color space is an RGB color space; and
   the color components of the gray pixels are altered to the predetermined color components by incrementing at least one of pixel levels of RGB components of the gray pixels.

4. The image processing device according to claim 1, wherein:
the first color space is an RGB color space;
the second color space is a CMYK color space; and
at least one of pixel levels of RGB components of the gray pixels is changed such that a pixel level of a B component of the RGB components is changed relatively to pixel levels of R and G components of the RGB components.

5. The image processing device according to claim 4, wherein the pixel levels of the R and G components are altered.

6. The image processing device according to claim 1, wherein the instructions further cause the image processing device to:
determine, in response to the specification that the received drawing command is the image drawing command, whether a number of colors included in image object data corresponding to the image drawing command is smaller than a predetermined number; and
reproduce the gray of gray pixels by the black coloring material in the second color space in response to the specification that a type of the drawing command is specified as the image drawing command and when the number of colors included in the image object data is smaller than the predetermined number.

7. The image processing device according to claim 1, wherein the instructions further cause the image processing device to:
alter the color components of the gray color of the gray pixels to the predetermined color components that are different from the original color components of the gray color without changing a number of color tones in the first color space, and thereby generate the first gray reproduction information according to the predetermined color components of the gray pixels.

8. The image processing device according to claim 7, wherein:
the first color space is an RGB color space: and
the color components of the gray pixels are altered to the predetermined color components by changing at least one of pixel levels of RGB components of the gray pixels.

9. The image processing device according to claim 3, wherein the instructions further cause the image processing device to:
determine whether the pixel level exceeds an upper limit of a tonal range by the increase of the pixel level; and
not increase the pixel level of the RGB components in response to determining that the pixel level would exceed the upper limit of the tonal range if increased.

10. An image forming apparatus comprising:
a control device;
an image forming device;
a receiver configured to receive a drawing command to execute a drawing process, the drawing command including object data; and
memory storing instructions that, when executed by the control device, cause the image forming apparatus to:
determine whether the receiver has received the drawing command;
specify whether the received drawing command is an image drawing command in response to a determination that the receiver has received the drawing command;
determine, in response to a specification that the received drawing command is the image drawing command, that a gray color of gray pixels included in the object data is to be reproduced by a mixture of multiple color materials;
generate, in response to a determination that the gray color is to be reproduced by the mixture of multiple color materials, first gray reproduction information representing that the gray color for each gray pixel is to be reproduced by the mixture of the multiple color materials;
determine, in response to a specification that the received drawing command is not the image drawing command, that the gray color of the gray pixels included in the object data is to be reproduced by black coloring material;
generate, in response to a determination that the gray color is to be reproduced by the black coloring material, second gray reproduction information representing that the gray color for each gray pixel is to be reproduced by the black coloring material;
generate raster data expressed in a first color space by rendering the object data to include the first gray reproduction information or the second gray reproduction information for each gray pixel; and
convert the raster data from the first color space to a second color space based on a corresponding one of the first and second gray reproduction information included in the raster data, the second color space being different from the first color space, and wherein, in the second color space, the gray color of the gray pixels is reproduced by a corresponding one of the black coloring material and the mixture of multiple color materials;
alter, in response to the specification that the received drawing command is the image drawing command, original color components of the gray color of the gray pixels included in the object data to predetermined color components that are different from the original color components of the gray color in the first color space, and thereby generate the first gray reproduction information based on the predetermined color components of the gray pixels;
determine, in the first color space, whether a gray pixel of the raster data includes color components that match the predetermined color components;
determine, in response to a determination that the gray pixel includes the color components that match the predetermined color components, that the gray color is to be reproduce by the mixture of multiple coloring materials,
return, in response to a determination that the gray pixel included the color components that match the predetermined color components and the gray color is to be reproduce by the mixture of multiple coloring materials, the predetermined color components of the gray pixel to the original color components of the gray color in the first space;
after returning the predetermined color components of the gray pixel to the original color components of the gray pixel in the first color space, convert the raster data including the gray pixel including the returned original color components from the first color space to the second color space so that the gray color is produce by the mixture of multiple coloring materials;
determine, in the first color space, whether the gray pixel of the raster data includes color components the match the original color components of the gray color; and convert, in response to a determination that the gray pixel includes the color components that match the original color components of the gray color, the raster data including the gray pixel from the first color space to the second color so that the gray color is produce by the black coloring material.

wherein the image forming device is configured to form an image on a recording medium based on the raster data expressed in the second color space.

11. The image forming apparatus according to claim 10, wherein:
the first color space is an RGB color space; and
the color components of the gray pixels are altered to the predetermined color components by incrementing at least one of pixel levels of RGB components of the gray pixels.

12. A non-transitory machine readable medium storing instructions that, when executed by a processor, cause an apparatus to:
receive a drawing command including object data;
specify whether the received drawing command is an image drawing command in response to receiving the drawing command;
determine, in response to a specification that the received drawing command is the image drawing command, that a gray color of gray pixels included in the object data is to be reproduced by a mixture of multiple color materials;
generate, in response to a determination that the gray color is to be reproduced by the mixture of multiple color materials, first gray reproduction information representing that the gray color for each gray pixel is to be reproduced by the mixture of the multiple color materials;
determine, in response to a specification that the received drawing command is not the image drawing command, that the gray color of gray pixels included in the object data is to be reproduced by black coloring material;
generate, in response to a determination that the gray color is to be reproduced by the black coloring material, second gray reproduction information representing that the gray color for each gray pixels is to be reproduced by the black coloring material;
generate raster data expressed in a first color space by rendering the object data to include the first gray reproduction information or the second gray reproduction information for each gray pixel;
convert the raster data from the first color space to a second color space based on a corresponding one of the first and second gray reproduction information included in the raster data, the second color space being different from the first color space and wherein, in the second color space, the gray color of the gray pixels is reproduced by corresponding one of the black coloring material and the mixture of multiple color materials;
alter, in response to the specification that the received drawing command is the image drawing command, original color components of the gray color of the gray pixels including in the object data to predetermined color components that are different from the original color components of the gray color in the first color space, and thereby the first gray reproduction information based in the predetermine color components of the gray pixels;
determine, in the first color space, whether a gray pixel of the raster data includes color components that match the predetermined color components;
determine, in response to a determination that the gray pixel includes the color components that match the predetermined color components, that the gray color is to be reproduce by the mixture of multiple coloring materials;
return, in response to a determination that the gray includes the color components that match the predetermined color components and the gray color is to be reproduce by the mixture of multiple coloring materials, the predetermined color components of the gray pixel to the original color components of the gray color in the first color space;
after returning the predetermined color components of the gray pixel to the original color components of the gray pixel in the first color components from the first color space to the second color space so that the gray is produce by the mixture of multiple coloring materials;
determine, in the first color space, whether the gray pixel of the raster data includes color components that match the original color components of the gray color; and
convert, in response to a determination that the gray pixel includes the color components that match the original color components of the gray color, the raster data including the gray pixel from the first color space to the second color space so that the gray color is produce by the black coloring material.

13. The non-transitory machine readable medium according to claim 12, wherein:
the first color space is an RGB color space; and
the color components of the gray pixels are altered to the predetermined color components by incrementing at least one of pixel levels of RGB components of the gray pixels.

* * * * *